US012650114B2

(12) United States Patent
Serdar

(10) Patent No.: US 12,650,114 B2
(45) Date of Patent: Jun. 9, 2026

(54) METHOD OF VECTORING ROCKET THRUST USING AN ELECTRIC FIELD

(71) Applicant: Ersel Ozan Serdar, Englewood, CO (US)

(72) Inventor: Ersel Ozan Serdar, Englewood, CO (US)

( * ) Notice: Subject to any disclaimer, the term of this patent is extended or adjusted under 35 U.S.C. 154(b) by 0 days.

(21) Appl. No.: 19/179,471

(22) Filed: Apr. 15, 2025

(65) Prior Publication Data

US 2025/0320854 A1 Oct. 16, 2025

Related U.S. Application Data

(60) Provisional application No. 63/633,857, filed on Apr. 15, 2024.

(51) Int. Cl.
*F03H 1/00* (2006.01)

(52) U.S. Cl.
CPC ......... *F03H 1/0037* (2013.01); *F03H 1/0006* (2013.01)

(58) Field of Classification Search
CPC ...... F03H 1/0037; F03H 1/0043; F03H 1/005; F03H 1/0056; F03H 1/0062; F03H 1/0068; F03H 1/0075; F03H 1/0081; F03H 1/0087; F03H 1/0093
See application file for complete search history.

(56) References Cited

U.S. PATENT DOCUMENTS 3,359,734 A * 12/1967 Guillaume ............ F03H 1/0093 219/121.11
3,638,054 A * 1/1972 Honigsbaum ............ H02N 3/00 310/10
(Continued)

FOREIGN PATENT DOCUMENTS

CN 119593898 A * 3/2025 ........... F03H 1/0087
EP 0890739 A1 * 1/1999 ............. B64G 1/413
(Continued)

OTHER PUBLICATIONS

Safety Data Sheet, Aerotech Consumer Aerospace, AeroTech Division, RCS Rocket Motor Components, Inc., Aug. 1, 2018, 8 pp.
(Continued)

*Primary Examiner* — Craig Kim
(74) *Attorney, Agent, or Firm* — James A. Sheridan; Sheridan Law, LLC

(57) ABSTRACT

There is disclosed a method of vectoring a rocket propulsion system producing a partly ionized exhaust jet along a longitudinal jet axis and through a nozzle. One or more pairs of electrodes may straddle the exhaust jet inside the nozzle or at a nozzle exit. A high-voltage DC supply may energize one or more of the electrode pairs with a strong electric field. A field intensity of the electric field may be scaled by the DC supply to proportionately deflect the exhaust jet away the longitudinal axis by a desired vectoring angle. The particular pair voltages sent to each pair of electrodes by the DC supply may be weighted for establishing a desired azimuth for the deflection. The strong electric field may laterally accelerate positively charged particles in the exhaust jet toward a negatively charged side of the one or more electrode pairs, thereby achieving the desired deflection and azimuth.

6 Claims, 11 Drawing Sheets

(56) References Cited

U.S. PATENT DOCUMENTS 4,445,911 A * 5/1984 Lind ........................ B03C 3/66
323/903
5,211,006 A * 5/1993 Sohnly ................. F03H 1/0081
60/202
5,291,734 A * 3/1994 Sohnly ..................... G21K 1/08
60/202
5,752,381 A * 5/1998 Speller ..................... F02K 9/80
60/228
5,966,452 A * 10/1999 Norris .................... G10K 15/04
381/71.8
7,380,756 B1 * 6/2008 Enloe .................. H05H 1/2439
244/175
8,453,457 B2 * 6/2013 Ginn ....................... F02K 1/386
60/770
8,944,370 B2 * 2/2015 Khozikov ................ H05H 1/54
244/73 R
9,670,913 B2 * 6/2017 Khozikov ............. F03H 1/0081
11,649,072 B1 * 5/2023 Esquivias .............. B64G 1/402
60/202
11,834,204 B1 * 12/2023 Gorokhovsky ........ B64G 1/413
12,129,052 B1 * 10/2024 Degenhardt ........... B64G 1/646
2006/0248895 A1 * 11/2006 Muldoon .................. F02K 7/00
73/722
2008/0115477 A1 * 5/2008 Samimy .................... F02K 1/46
60/39.5
2011/0048025 A1 * 3/2011 Ginn ....................... F02K 1/386
60/770
2014/0347069 A1 * 11/2014 Krumpholz .............. H02H 3/52
324/541
2015/0047526 A1 * 2/2015 Sawka ................ F42C 19/0819
102/374
2017/0314540 A1 * 11/2017 Nikic ....................... H05H 1/54
2019/0152625 A1 * 5/2019 Krauss .................. F03H 1/0037
2022/0090560 A1 * 3/2022 Lugg ......................... F02K 7/18
2022/0194633 A1 * 6/2022 Vasconcelos da Costa ................
F03H 1/0037
2025/0081321 A1 * 3/2025 Martin ................... H05H 1/488

FOREIGN PATENT DOCUMENTS

EP 1615476 A2 * 1/2006 ......... H05B 41/2856
EP 4276307 A1 * 11/2023 ............. B64G 1/413
WO WO-2016181360 A1 * 11/2016 ........... F03H 1/0018
WO WO-2020117354 A2 * 6/2020 ............... H05H 1/54
WO WO-2023056046 A1 * 4/2023 ........... F03H 1/0087
WO WO-2024118039 A2 * 6/2024 ............. B64G 1/428
WO WO-2025017475 A1 * 1/2025 ............... F02K 9/78
WO WO-2025120165 A1 * 6/2025 ............. B64G 1/413

OTHER PUBLICATIONS

Zhen, H.S., et al., "An Experimental Study on the Effect of DC Electric Field on Impinging Flame", Fuel 274(2020) 117846, https://doi.org/10.1016/j.fuel.2020.117846, Apr. 20, 2020, 11 pp.
Koroteev, Anatoly S., et al., "Development of lon Thruster IT-500", The European Physical Journal D, Eur. Phys. J. D (2017) 71:120, May 23, 2017, 10 pp.
Chien, Yu-Chien, et al., "Electric Field Induced Changes of a Diffusion Flame and Heat Transfer Near an Impinging Surface", Energies 2018, 11, 1235; doi:10.3390/en11051235, www.mdpi.com/journal/energies, May 12, 2018, 13 pp.
Das, Arnab K., et al. "Fluidic Thrust Vector Control of Aerospace Vehicles: State-of-the-Art Review and Future Prospects", Journal of Fluids Engineering, Aug. 2023, vol. 145, 080801-1, 29 pp.
Garrigues, L., et al., "Performance Modeling of a Thrust Vectoring Device for Hall Effect Thrusters", Societe Nationale d'Etude et de Construction de Moteurs d'Aviation, 27208 Vernon, France, DOI: 10.2514/1.39680, Journal of Propulision and Power, vol. 25, No. 5, Sep.-Oct. 2009, 10 pp.
Guo, Changchao, et al., "Thrust Control by Fluidic Injection in Solid Rocket Motors", Journal of Propulsion and Power, vol. 33, No. 4, Jul.-Aug. 2017, 15 pp.
Bapat, Archit, et al., "Hall-Effect Thrusters for Deep-Space Missions: A Review", IEEE Transactions on Plasma Science, vol. 50, No. 2, Feb. 2022, 14 pp.
Prager, J., et al. "Modeling lon Chemistry and Charged Species Diffusion in Lean Methane-Oxygen Flames", Proceedings of the Combusion Institute 31 (2007) 1129-1137, 9 pp.
King, H.J., et al., "Thrust Vectoring Systems", AIAA Paper No. 70-1150,AIAA 8th Electric Propulsion Conference, Sep. 1970, 5 pp.
Morningstar, R.E., et al., "An Operational Satellite Propulsion System Providing for Vernier Velocity, High and Low Level Attitude Control and Spin Trim", AIAA Paper No. 72-1130, AIAA/SAE 8th Joint Propulsion Specialist Conference, Dec. 1, 1972, 8 pp.
Strykowski, P.J., "Counterflow Thrust Vectoring of Supersonic Jets", AIAA Journal, vol. 34, No. 11, Nov. 1996, 9 pp.
Strykowski, P.J., et al., "Vectoring Thrust Using Confined Countercurrent Shear Layers", American Institute of Aeronautics and Astronautics, Inc., 1997, 6 pp.
Lev, Dan, et al., "The Technological and Commercial Expansion of Electric Propulsion in the Past 24 Year", IEPC-2017-242, The 35th International Electric Propulsion Conference, Georgia Institute of Technology, USA, Oct. 8-12, 2017, 19 pp.
Thrust Vectoring Systems—Final Report, Dec. 1972, by lon Device Physics Department Staff, Hughs Research Laboratories, 79 pp.
Wu, Jain-Ming, et al., "Approximate Analysis of Thrust Vector Control by Fluid Injection", DOI:10.2514/8.5891, http://acr.aiaa.org, Dec. 1961, 9 pp.
Chang Diaz, F. R., et al. "The Development of the VASIMR Engine", International Conference on Electromagnetics in Advanced Applications, Sep. 13 to 17, 1999, 6 pp.
Ebersohn, Frans, et al., "Magnetic Nozzle Plasma Plume: Review of Crucial Physical Phenomena", American Institute of Aeronautics and Astronautics, 2012, 12 pp.
Collett, C.R., et al., "Vectoring the Beam from lon Bombardment Thrusters", American Institute of Aeronautics and Astronautics Paper No. 71-691, 1971, 14 pp.
Duchemin, O., et al., "Development of a Prototype Thrust Steering Device for Hall-Effect Thrusters", European Space Agency, 2004, 8 pp.
Bates, Lisa B., et al., "Developmental Testing of Electric Thrust Vector Control Systems for Manned Launch Vehicle Applications", Proceedings of the 41st Aerospace Mechanisms Symposium, Jet Propulsion Laboratory, May 2012, 39 pp.
Duchemin, Oliver, et al., "Testing of a Thrust Steering Device on the PPS 1350 Hall Thruster", American Institute of Aeronautics and Astronautics, 2006, 22 pp.
Fukuyama, Takao, et al., "Dynamic Behaviours of a Flame as Plasma in a Strong Electric Field", Scientific Reports (2019) 9:15811, https://doi.org/10-1038/s41598-019-50537, 8 pp.
Gan, Yunhua, et al., "Effects of Direct-Current Electric Fields on Flame Shape and Combustion Characteristics of Ethanol in Small Scale", Advances in Mechanical Engineering, 2016, vol. 8(1) 1-14.
Chien, Yu-Chien, et al., "Electric Field Induced Changes of a Diffusion Flame and Heat Transfer Near an Impinging Surface", Energies 2018, 11, 1235; doi:10.3390/en11051235, www.mdpi.com/journal/energies, 13 pp.
Fearn, David G., "Ion Thruster Thrust Vectoring Requirements and Techniques", Space Department, QinetiQ, IEPC-01-115, 18 pp.
Robinson, Philip J., et al., "Non-Toxic Dual Thrust Reaction Control Engine Development for On-Orbit APS Applications", American Institute of Aeronautics and Astronautics, 2003, 11 pp.
Malik, Lohit, "Novel Concept of Tailorable Magnetic Field and Electron Pressure Distribution in a Magnetic Nozzle for Effective Space Propulsion", Propulsion and Power Research 2023; 12(1):59-68.
Kurniawan, Joshua Levin, et al., "Robust Controller Design for Planar Rocket with Thrust Vectoring Control", Conference Paper—Oct. 2023, https://www.researchgate.net/publication/376213285, 8 pp.
Sutton, George P., et al., "Rocket Propulsion Elements", Ninth Edition, 2017, 792 pp.
Lee, Richard H.C., et al., "Studies of Plasma in Rocket Plumes", Space Division Air Force Systems Command, May 17, 1982, 63 pp.

(56) References Cited

OTHER PUBLICATIONS

Takahashi, Kazunori, “Thirty Percent Conversion Efficience from Radiofrequency Power to Thrust Energy in a Magnetic Nozzle Plasma Thruster”, Scientific Reports, (2022)12:18618, https://doi.org/10.1038/s41598-022-22789-7.

* cited by examiner

Nozzle Vectoring

Nozzle Vectoring

Nozzle Vectoring

Gridded Ion Thruster

Hydrazine Thruster

METHOD OF VECTORING ROCKET THRUST USING AN ELECTRIC FIELD

CROSS REFERENCE TO RELATED APPLICATIONS

This patent application claims priority to U.S. Provisional Application No. 63/633,857 filed on Apr. 15, 2024, and entitled ROCKET MOTOR THRUST VECTORING USING ELECTRIC FIELDS, the entire contents of Application 63/633,857, hereby expressly incorporated herein by reference.

BACKGROUND

Rocket engines may oxidize or catalyze chemical propellants in order to generate an exhaust jet along a longitudinal axis at 2-6 km/sec. FIG. 1 shows a bi-propellant (fuel and oxidizer) prior art engine. Thrust may range from kilonewtons to meganewtons. Vectoring of the exhaust jet by 2-15° may correct a rocket trajectory utilizing mechanical means such as a gimballing an engine nozzle (FIGS. 2*a*-2*c*), pivoting thrust vanes, or adding steerable engines (not shown). A torque may be generated about the center of mass of the rocket, which rotation may then need to be counter-torqued after a course correction (FIG. 2*c*). However, the vectoring mechanics may be prone to failure, increase engine weight by up to one-third, and reduce propulsion efficiency by 3% or more.

For stationkeeping, docking operations, and deep space missions, an electric or ion thruster may accelerate ionized atoms to produce the exhaust jet at 20-100 km/s using electromagnetic fields or an extraction grid operating at several kV (FIG. 3). Propellants such as xenon or argon atoms may be bombarded with electrons to produce the positive ions. Unfortunately, repositioning of the extraction grid mechanically may be necessary for deflecting the exhaust jet by up to +10°, again adding weight to the engine.

Hydrazine thrusters may be a lightweight and simple device for correcting spacecraft attitude or orbit (FIG. 4). Here, the combustion chamber depicted in FIG. 1 may be a catalyst bed for activating the hydrazine mono-propellant. Unfortunately, hydrazine fuel is highly toxic and complex to handle.

Additionally, electric thrusters, while having a much higher specific impulse (Isp), provide only millinewtons to a few newtons of thrust, and thus are best suited for unmanned missions where a long acceleration time is acceptable. Also, electric engines are not operable in the atmosphere.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is disclosed a method for vectoring a propulsion system of a rocket. The propulsion system may produce an at least partially ionized exhaust jet along a longitudinal jet axis, through an engine nozzle, and opposite a direction of rocket thrust. The method may further comprise straddling the exhaust jet with one or more pairs of parallel electrodes lateral to the exhaust jet. The electrodes may be distributed circumferentially over 360° and may have an electrode length along the nozzle. The electrodes may also extend externally from a nozzle exit.

The electrode pairs may be energized with a high-voltage DC supply for impressing a strong electric field across the exhaust jet. The DC supply may scale a field intensity of the electric field in proportion to a desired deflection of the exhaust jet off the longitudinal axis, deflecting by a vectoring angle. The DC supply may send a pair voltage to one or more of each of the electrode pairs, and may weight the pair voltage among the pairs for establishing a desired azimuth of the deflected exhaust. Positively charged particles in the exhaust jet may be accelerated laterally toward a negatively charged side of the one or more electrode pairs.

In another embodiment, there is disclosed a steering system for vectoring an at least partially ionized exhaust jet of a rocket. The exhaust jet may occur along a longitudinal axis of the jet, through an engine nozzle, and opposite a direction of exhaust thrust. The steering system may comprise one or more pairs of parallel electrodes distributed circumferentially over 360° inside the nozzle along an electrode length. Each pair may be arranged laterally for independently straddling the exhaust jet. The nozzle may include a region beyond but adjacent to a nozzle exit.

The steering system may include a high-voltage DC supply connectable to the one or more pairs of electrodes. The DC supply may be configured to impress a strong electric field across the exhaust jet. A steering control unit may be configured to scale a field intensity of the strong electric field proportional to a desired vectoring angle of the exhaust jet. The steering control may also be configured to weight among all of the one or more electrode pairs a pair voltage sent by the DC supply to each of the one or more electrode pairs. The weighting may effect a steering of the deflected exhaust to a desired azimuth. Positively charged particles in the exhaust jet may be accelerated laterally toward a negatively charged side of the one or more electrode pairs.

In a further embodiment, there is disclosed a rocket propulsion system for steering a rocket using an electric field to vector a thrust of the propulsion system. The propulsion system may comprise a chemical engine configured to oxidize or catalyze a propellant and produce an exhaust jet. The exhaust jet may occur along a longitudinal jet axis and through an engine nozzle in a direction opposite the rocket thrust. One or more pairs of parallel electrodes may be distributed circumferentially and along an electrode length of the nozzle. Each electrode pair may be arranged laterally for independently straddling the exhaust jet. The nozzle may include a region beyond a nozzle exit of the nozzle.

A high-voltage DC supply may connect to the one or more pairs of electrodes for impressing a strong electric field across the exhaust jet. A steering control may drive the DC supply and be configured to set a field intensity of the strong electric field. The intensity of the electric field may be set proportional to a desired vectoring angle of the exhaust jet with respect to the longitudinal axis. The steering control may also be configured to weight among all of the one or more electrode pairs a pair voltage sent by the DC supply to each of the one or more electrode pairs. The weighting action may steer the deflected exhaust to a desired azimuth. Positively charged particles in the exhaust jet are accelerated laterally toward a negatively charged side of the one or more electrode pairs by the electric field.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

When elements are referred to as being "connected" or "coupled," the elements can be directly connected or coupled together or one or more intervening elements may also be present. In contrast, when elements are referred to as being "directly connected" or "directly coupled," there are no intervening elements present.

As may be appreciated, based on the disclosure, there exists a need in the art for a lightweight thrust vectoring system with a minimum of moving parts.

Additionally, there exists a need in the art for a thrust vectoring system usable in the atmosphere as well as in deep space. Further, there exists a need in the art for a thrust vectoring system suitable for medium and high-thrust propulsion systems.

Figure 2A:
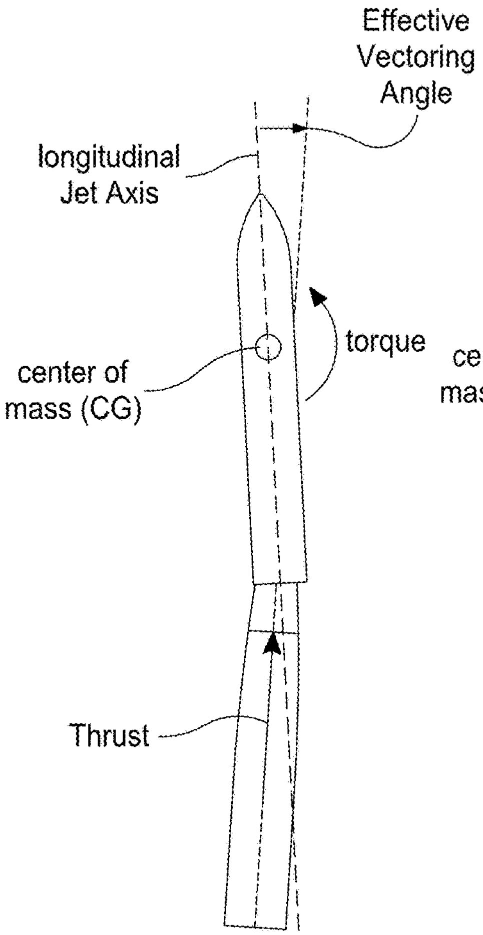
FIG. 2a (PRIOR ART)
FIGS. 2*a*-2*c* are an illustration of nozzle vectoring of a chemical rocket in the prior art.
Figure 2B:
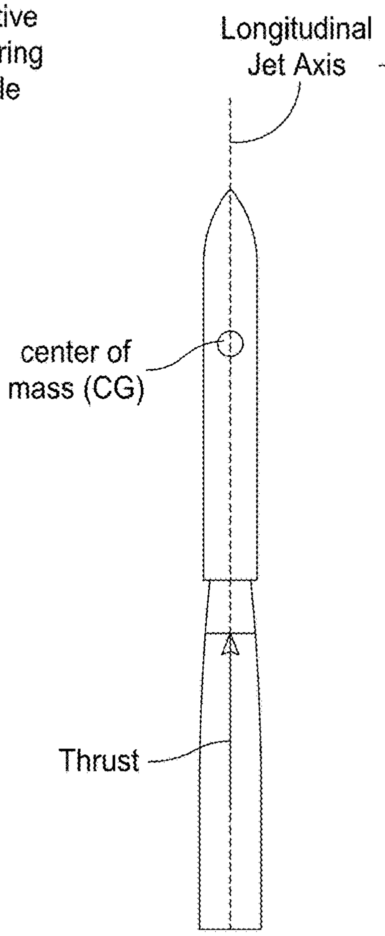
FIG. 2b (PRIOR ART)
Figure 2C:
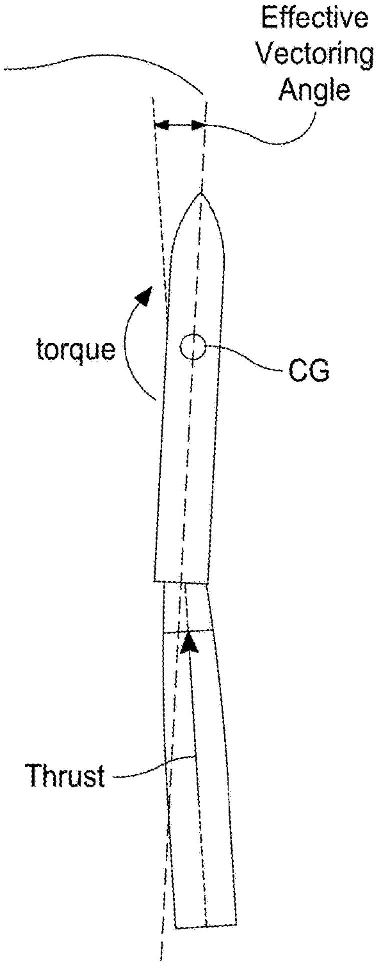
FIG. 2c (PRIOR ART)
Figure 3:
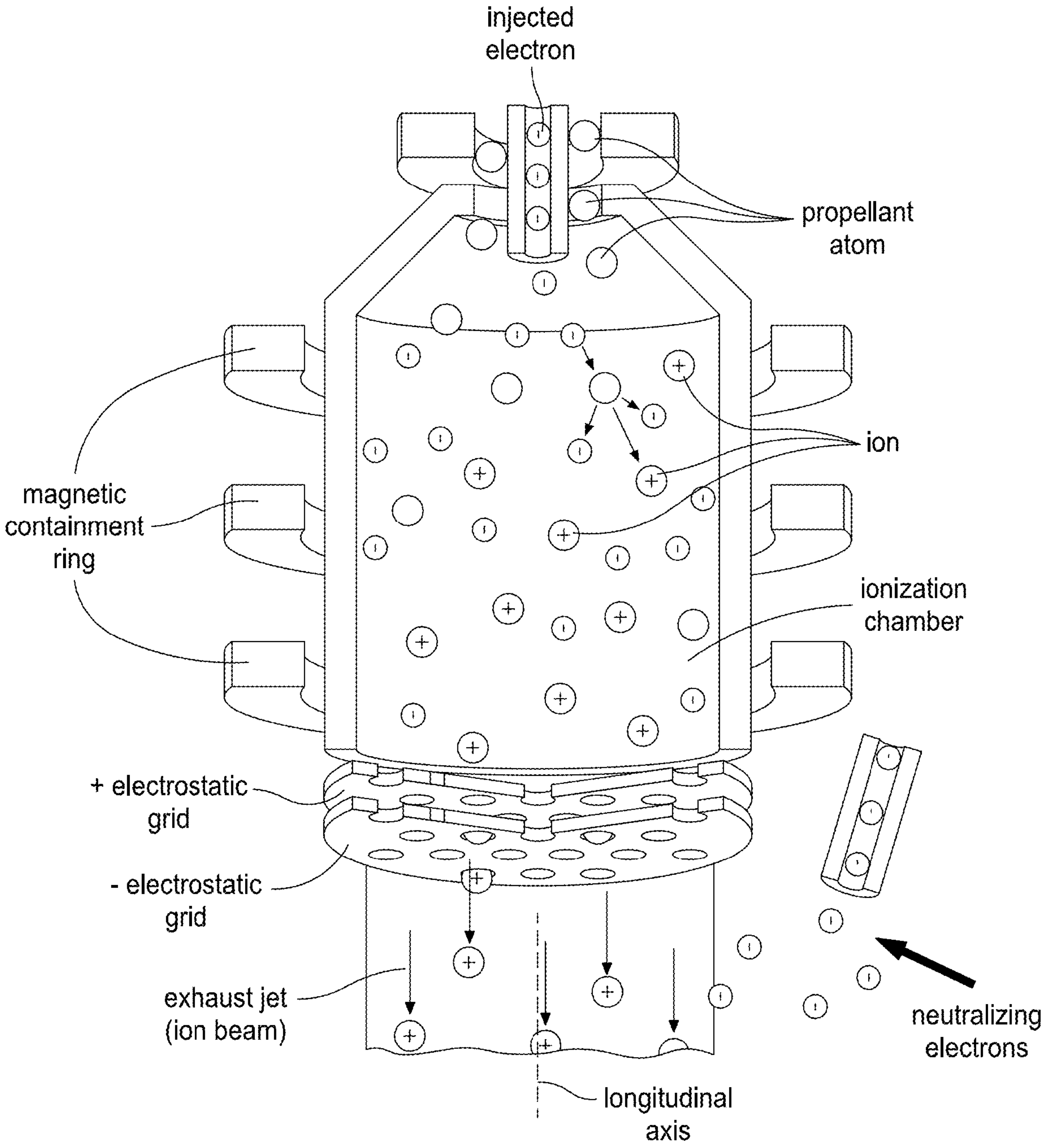
FIG. 3 (PRIOR ART)
FIG. 3 is a perspective illustration of a gridded ion thruster in the prior art.

Referring now to FIGS. 5*a*-8, in various embodiments, a method and system are described for vectoring a propulsion system 10 of a rocket 12 (FIGS. 1-2) in order to steer an exhaust jet 14 of the propulsion system 10. The exhaust jet 14 may be at least partially ionized and may nominally occur along a longitudinal jet axis 15 for generating thrust in an direction opposite the jet 14. The exhaust jet 14 may result from an oxidation or catalysis of a chemical fuel such as hydrogen, kerosene, methane, hydrazine (FIGS. 1, 4), or other hydrocarbon fuels. Alternatively, the exhaust jet 14 may be a substantially ionized propellant resulting from electromagnetically producing, accelerating, and neutralizing positively charged ions (FIG. 3). Examples of such an electric propulsion system 10 may include an ion thruster, a Hall Effect thruster, an arcjet thruster, a magnetoplasmadynamic (MPD) engine, or a Variable Specific Impulse Magnetoplasma Rocket (VASIMR).

Figure 1:
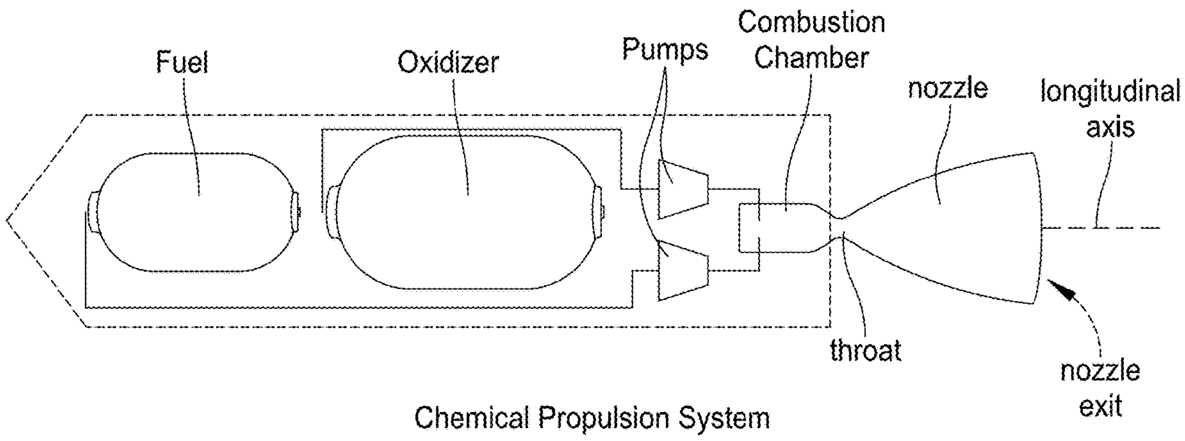
FIG. 1 (PRIOR ART)
FIG. 1 is a side view illustration of a chemical propulsion system in the prior art.
Figure 4:
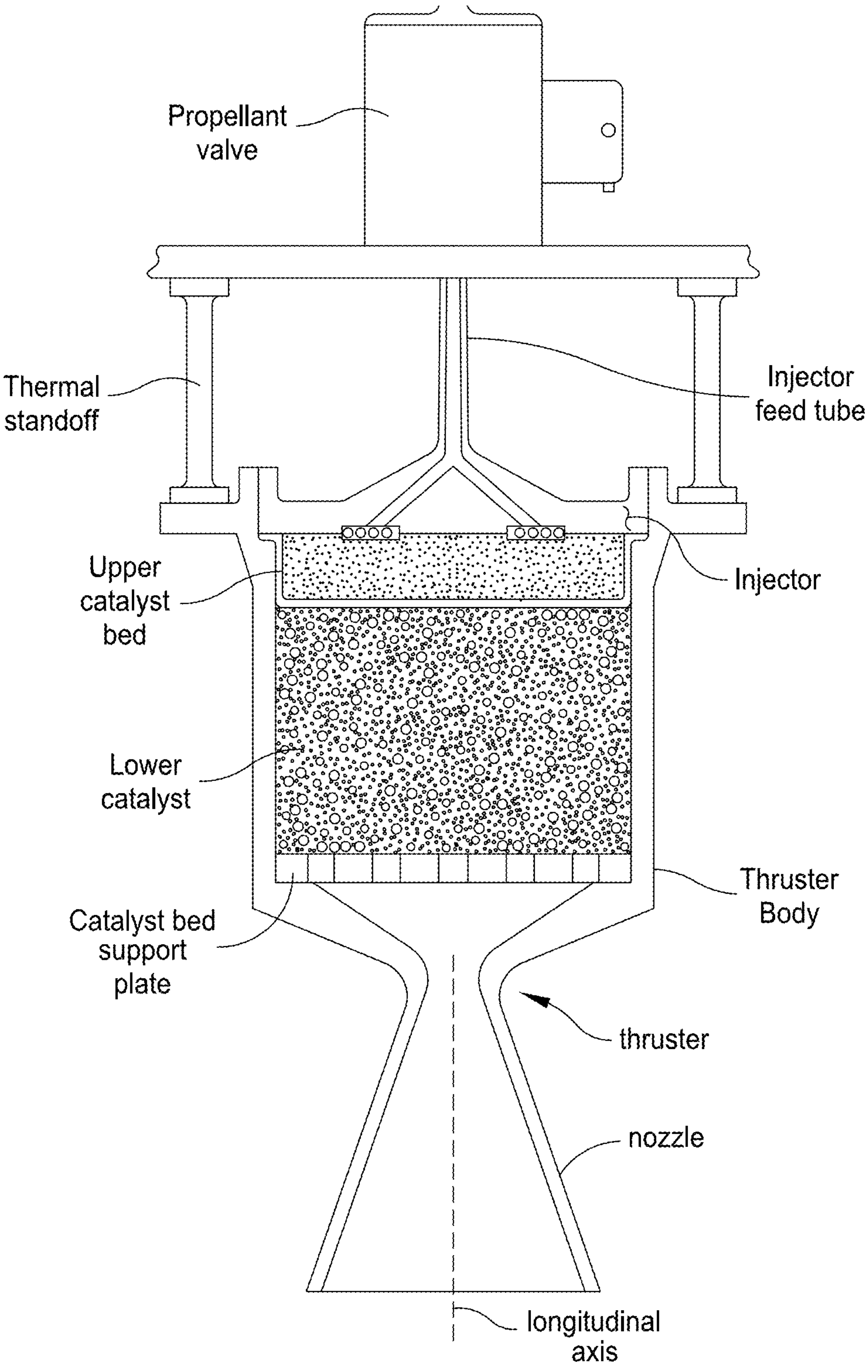
FIG. 4 (PRIOR ART)
FIG. 4 is a side view of a hydrazine propulsion system in the prior art.

Continuing, the propulsion system 10 may include a propulsion chamber 11 from which the exhaust jet 14 emerges, which may be considered a combustion chamber in the case of a chemical engine. The chamber 11 may feed a nozzle 16 for accelerating the exhaust jet toward a nozzle exit 17. The nozzle 16 may be cone-shaped and flare out toward the exit 17 in order to accelerate the exhaust jet 14. Alternatively, the nozzle may be an ionization chamber connected to the propulsion chamber 11 and having a planar exit (FIG. 3). The propulsion chamber 11 may narrow to a throat before conically opening into the nozzle 16 for accelerating the propellant (FIGS. 1, 4).

Figure 5A:
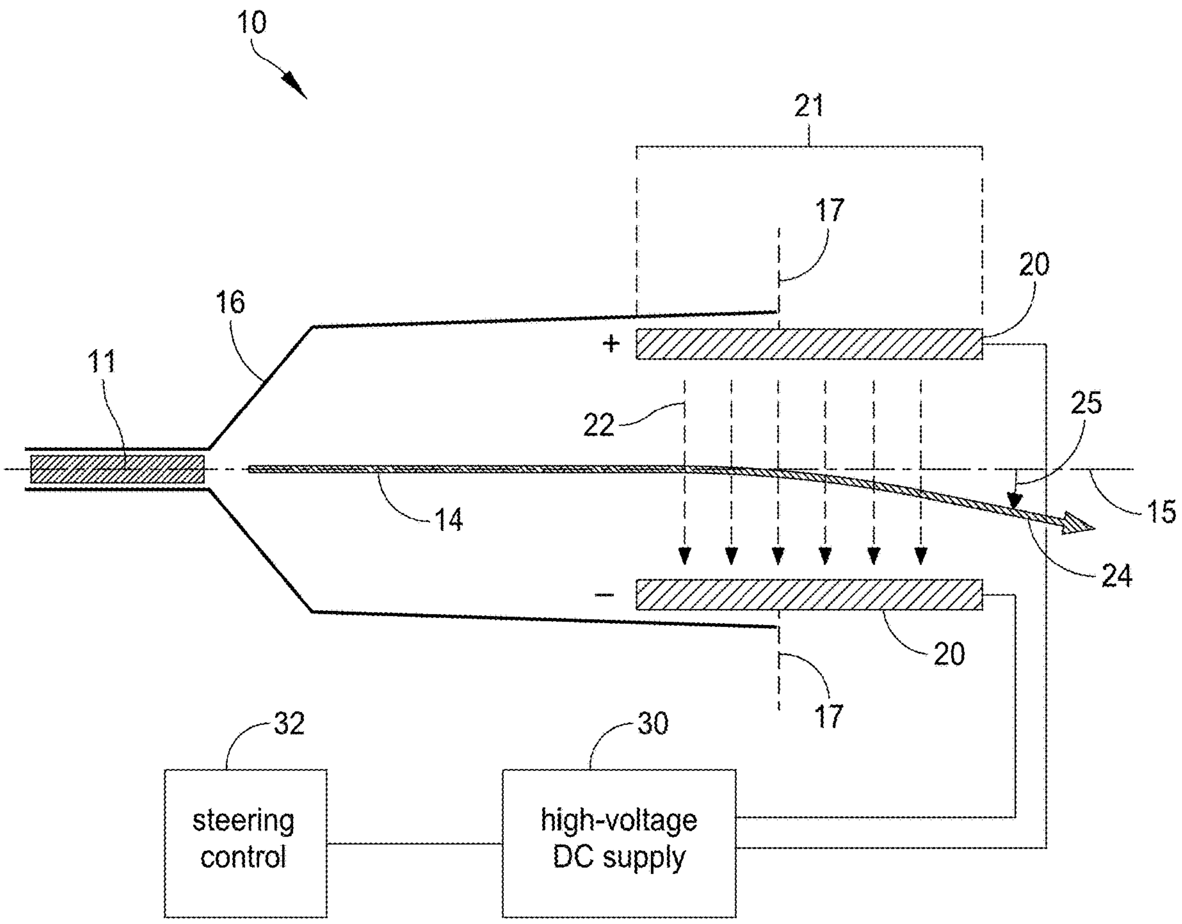
FIGS. 5*a*-5*b* are side view illustrations of a propulsion system with a single pair of electrodes for vectoring rocket thrust, in accordance with an embodiment of the present disclosure.
Figure 5B:
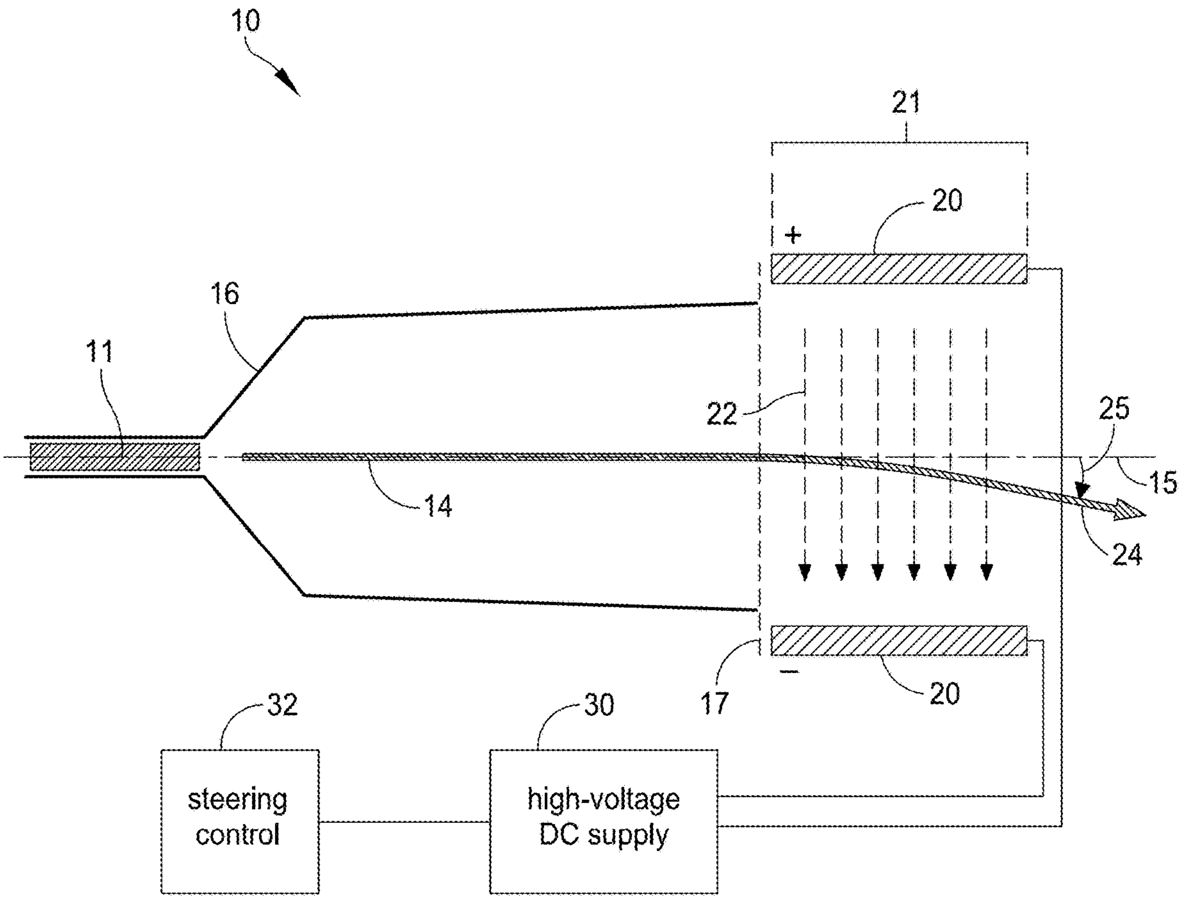
Figure 6:
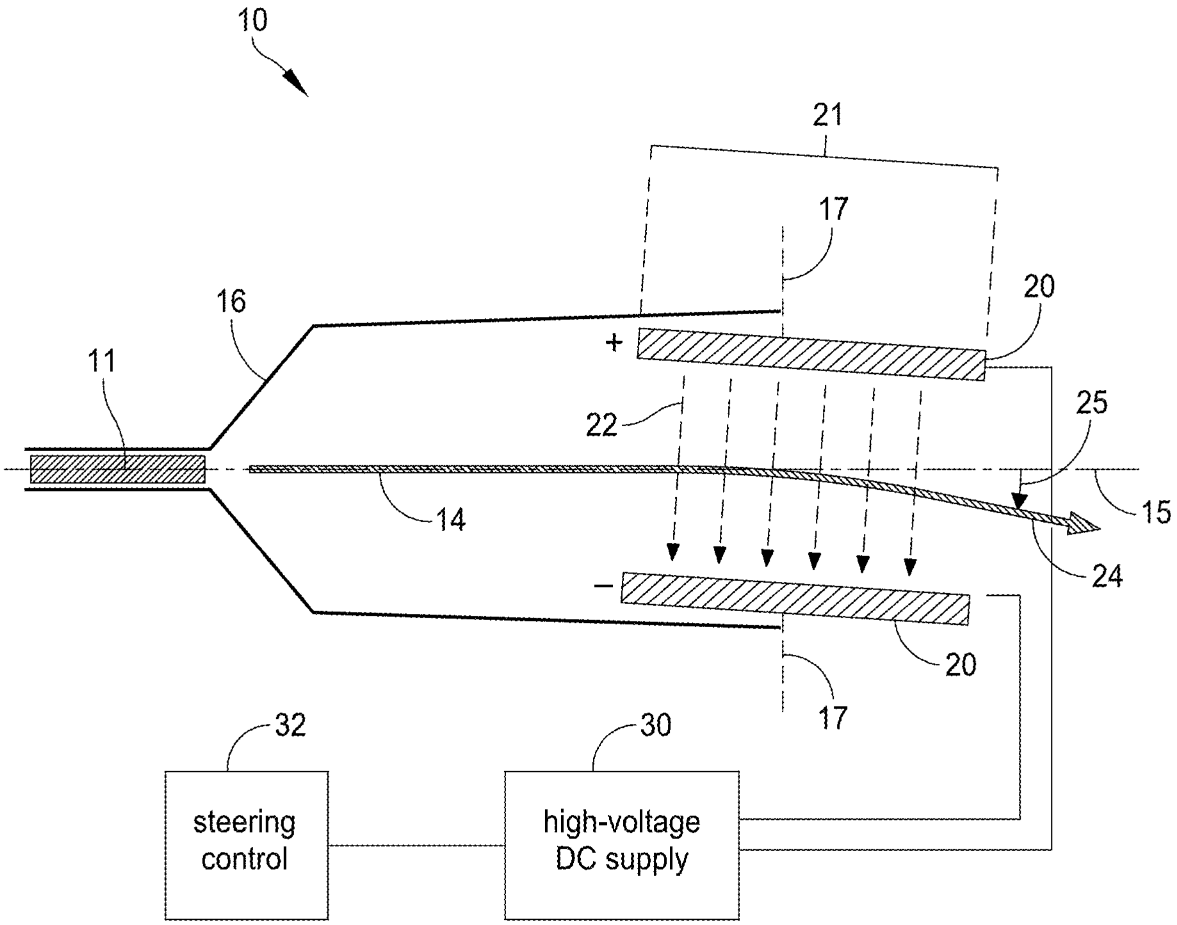
FIG. 6 is a side view illustration of the propulsion system of FIG. 5*a* with an angled pair of electrodes for vectoring the rocket thrust, in accordance with an embodiment of the present disclosure.

Continuing with FIGS. 5*a*-8, in various embodiments, the method may include straddling the exhaust jet 14 with one or more pairs of parallel electrodes 20 lateral to the exhaust jet 14 and distributed circumferentially over 360°. The electrodes 20 may have an electrode length 21 along an inside (or outside) of the nozzle 16, or may extend substantially or wholly from the nozzle exit 17 (FIGS. 5*a*-6). The method may include energizing one or more of the parallel electrodes 20 with a strong electric field 22 across the exhaust jet 14 using a high-voltage DC supply 30. The two electrodes 20 of each pair may be diametrically opposed for creating the strong electric field 22 which is perpendicular to the exhaust jet 14. Each of the electrode pairs may be arranged circumferentially to independently straddle the exhaust jet 14 such that their respective electric fields 22 do not interfere with each other. Alternatively, the electrodes 20 may be arranged circumferentially with partial overlap between adjacent electrodes for additional steering effects and more complex vectoring control.

The propulsion system 10 may configured such that positively charged particles in the exhaust jet 14 are accelerated laterally toward a negatively charged side of each electrode pair impressed with the strong electric field 22. The Coulomb force on the charged particle may be related to the identity $q \times E$, where $E$ is the electric field strength and $q$ is the charge of an ion. The electric field 22 may thereby deflect the exhaust jet 24 off the longitudinal axis 15 by an effective vectoring angle 25. In addition, free electrons and negatively charged particles in the exhaust jet 14 may be accelerated toward a positively charged side of the electrode pair.

Figure 7:
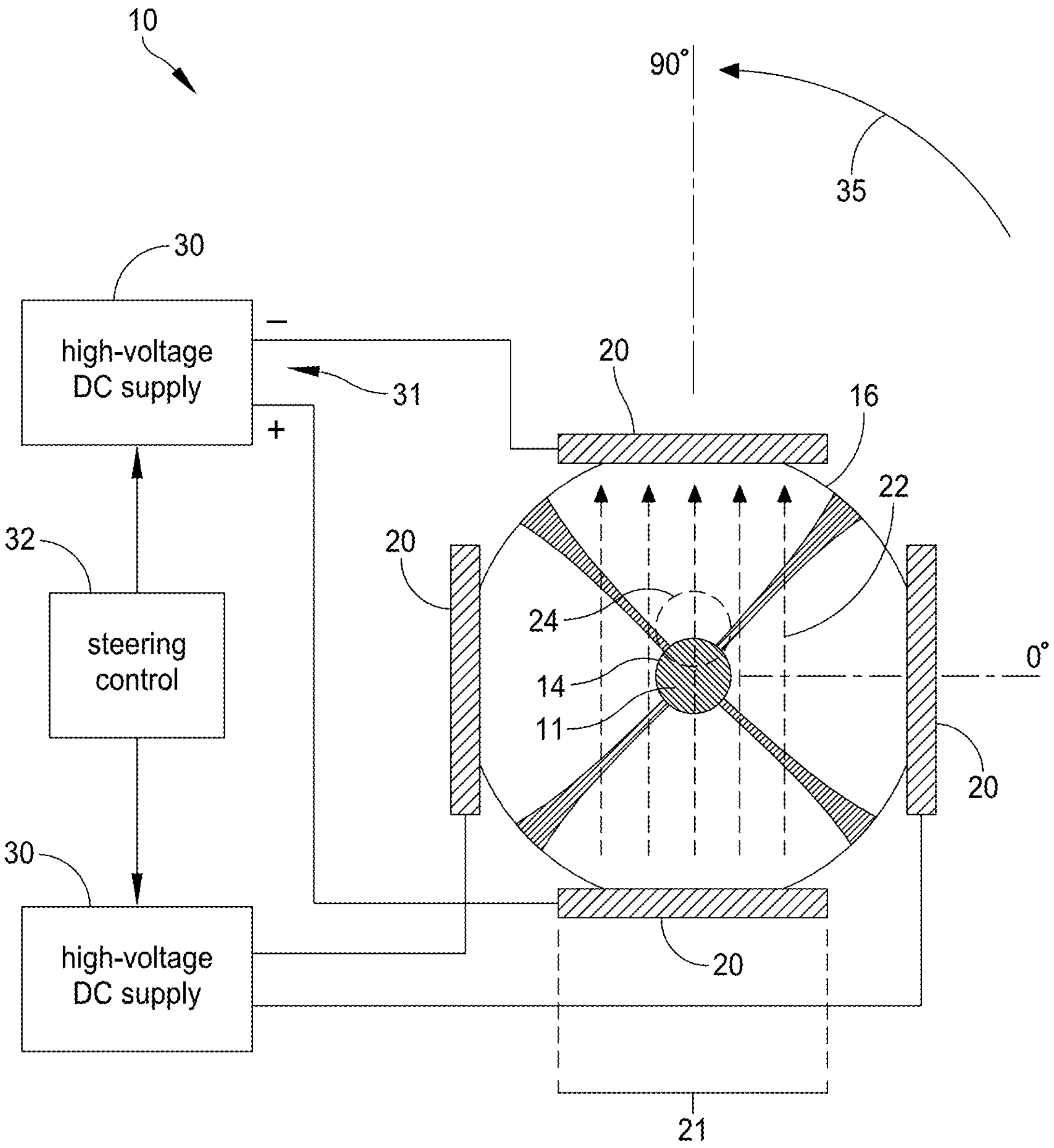
FIG. 7 is an end view the propulsion system of FIG. 5*a* with two pairs of electrodes for vectoring the rocket thrust, in accordance with an embodiment of the present disclosure.
Figure 8:
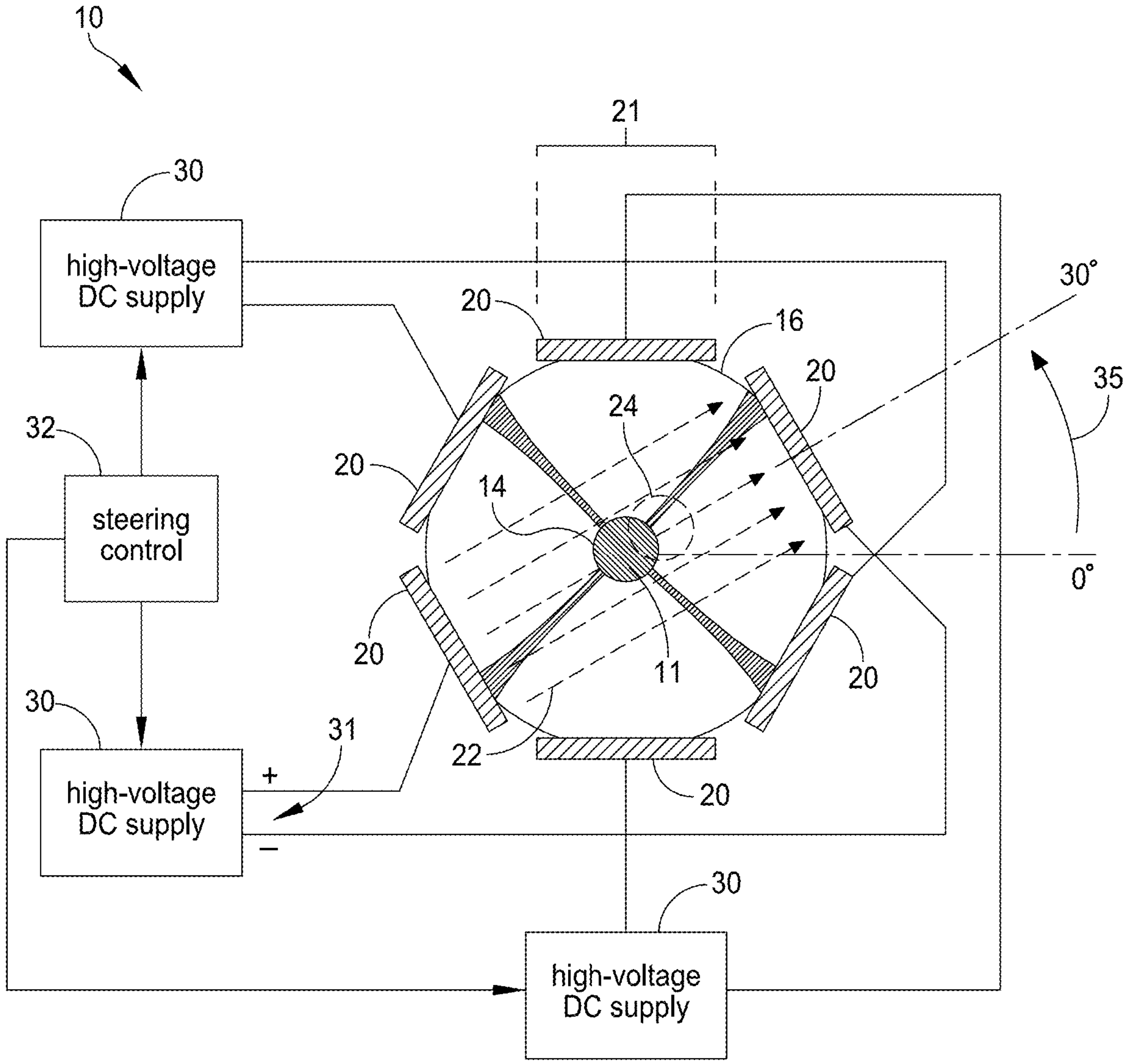
FIG. 8 is an end view the propulsion system of FIG. 5*a* with three pairs of electrodes for vectoring the rocket thrust, in accordance with an embodiment of the present disclosure.

In the embodiments depicted in FIGS. 5*a*-8, only one pair of electrodes 20 is energized, or may be primarily energized, in which case a vectoring azimuth 35 of the deflected exhaust jet 24 may be in a direction of the negatively charged electrode 20 (FIGS. 7-8). In other embodiments (not shown), two or more electrode pairs may be simultaneously energized to shift the vectoring azimuthal over a 360° range and not aligned with any one pair of parallel electrodes 20. The electrode pair may be angled (FIG. 6) or tilted in order to amplify or bias the deflection of exhaust jet 24 by the electric field 22 in a particular direction.

Continuing with FIGS. **5*a*-8, the method may further include a steering control unit 32 connected to the high-voltage DC supply 30, the steering control 32 for scaling a field intensity of the electric field 22 in proportion to the desired vectoring angle 25. For example, the strong electric field 22 may be set to 100 kV/m, which may then produce a first lateral force and the vectoring angle 25. Then, doubling the field intensity to 200 kV/m may be expected to double the lateral force applied to the exhaust jet 14 and a larger vectoring angle 25, assuming all other conditions remain unchanged and linear in behavior. The required lateral force of the electric field 22 on charged particles in the exhaust jet 14 may depend on the longitudinal rocket thrust according to a tangent of the desired vectoring angle 25**:

$$\tan[\text{vectoring angle}] = \text{lateral force}/\text{rocket thrust}.$$

Referring still to FIGS. **5*a*-8, in various embodiments, the method may also include weighting a pair voltage 31 sent by the DC supply 30 to each of the one or more electrode pairs in order to establish the desired vectoring azimuth 35 of the deflected exhaust jet 24. The steering control 32 may set the vectoring angle 25 and the vectoring azimuth 35 of the deflected exhaust jet 24 by setting the pair voltage 31 for each of the electrode pairs at the appropriate scale and the relative weighting. A steering system for vectoring the at least partially ionized exhaust jet 14 may comprise 2 pairs of electrodes 20 lining the nozzle 16 as shown in FIG. 7, where each electrode 20 may be circumferentially offset by 90°. The steering system may also comprise 3 pairs of electrodes 20 lining the nozzle 16 as shown in FIG. 8, where each electrode 20 may be circumferentially offset by 60°. Beneficially, the exhaust jet 14** may be deflected by degree and azimuth without moving parts.

The effective vectoring angle 25 achievable by lateral acceleration may also depend on one or more of the following: the proportion of exhaust molecules and atoms that are ionized or deflectable by the strong electric field 22, the electrode length 21, and an arc voltage above which an electric arc forms between each of the pair of parallel electrodes 20. The method may include increasing the number of the positively charged particles in the exhaust jet 14 by one of the following ionizing means: RF heating, magnetic heating, electron bombardment, and introducing metallic particles into the exhaust.

The method may include detecting, by the steering control 32, an arc occurring across one or more of the electrode pairs should the electric field 22 be too strong. The arc detection may thereupon terminate and reset the electric field 22 at a lower level. The steering control 32 may also operate in a pulsed mode, applying the pair voltage 31 until arcing is detected and then shutting down the electric field 22 and quickly restarting it, resulting in a thrust vectoring that happens in pulses.

Figure 9:
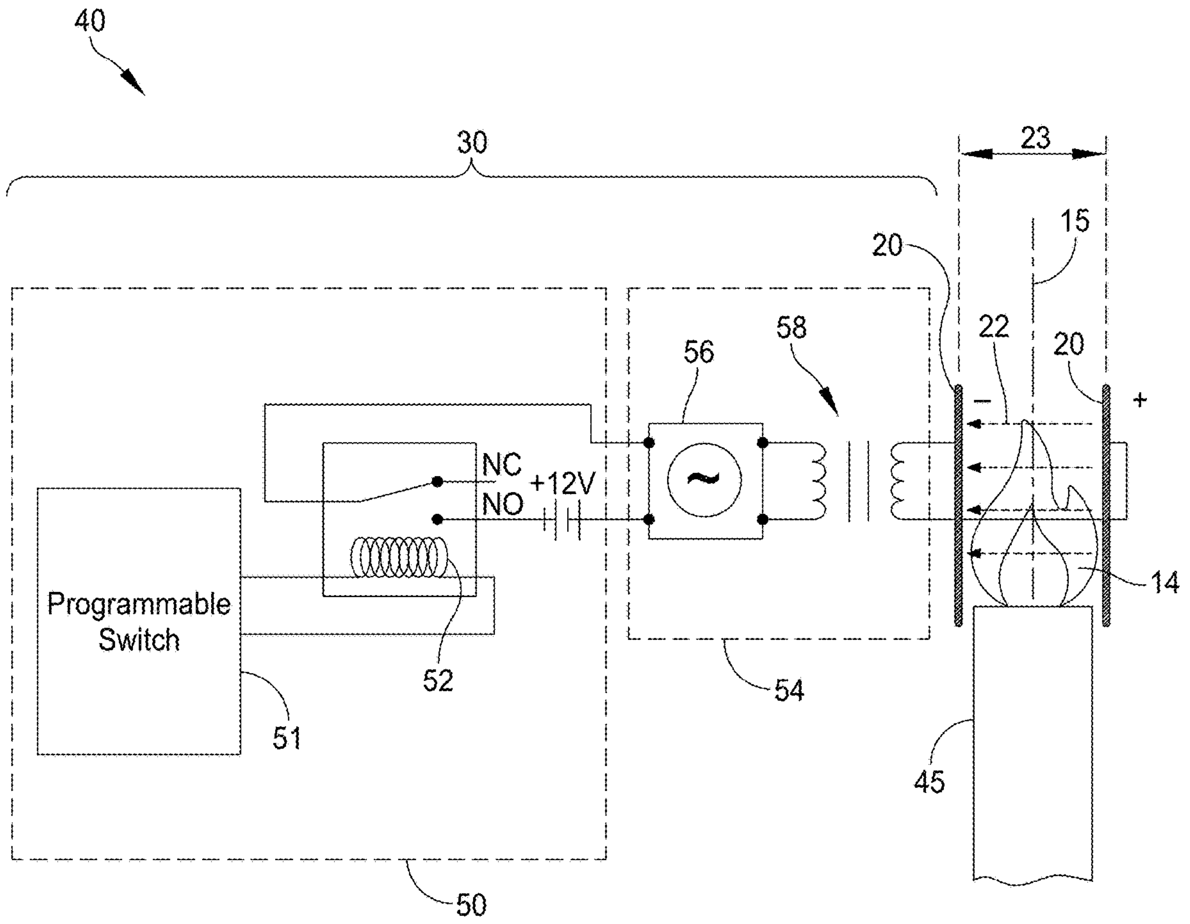
FIG. 9 is a diagram of a test circuit for measuring thrust vectoring on a Bunsen flame, in accordance with an embodiment of the present disclosure.

Referring now to FIGS. 7-10, in various embodiments, the high-voltage DC supply 30 may comprise a low voltage supply 50 and a step-up converter 54. The low voltage supply 50 may comprise a battery, an output from an on-board gas generator, a solar array, or other suitable source, and may also include control circuitry such as the programmable switch 51 and relay 52 for timing or pulsing the exhaust vectoring (FIG. 9). The low voltage supply 50 may also include a more complex controller that can actively respond to changes in the steering and respond to the vehicle's steering needs in the moment. In one embodiment used for proof-of-concept testing, the low voltage supply 50 included a power supply operating at 12 volts and 18 volts. The step-up converter 54 may comprise an oscillator 56 and a flyback transformer 58 for stepping up the low voltage supply by a factor of roughly 1000 (FIGS. 9-10) or greater. The flyback transformer may include diode rectification and capacitive filtering to create a steady and high DC pair voltage 31 (FIGS. 7-8).

Figure 10:
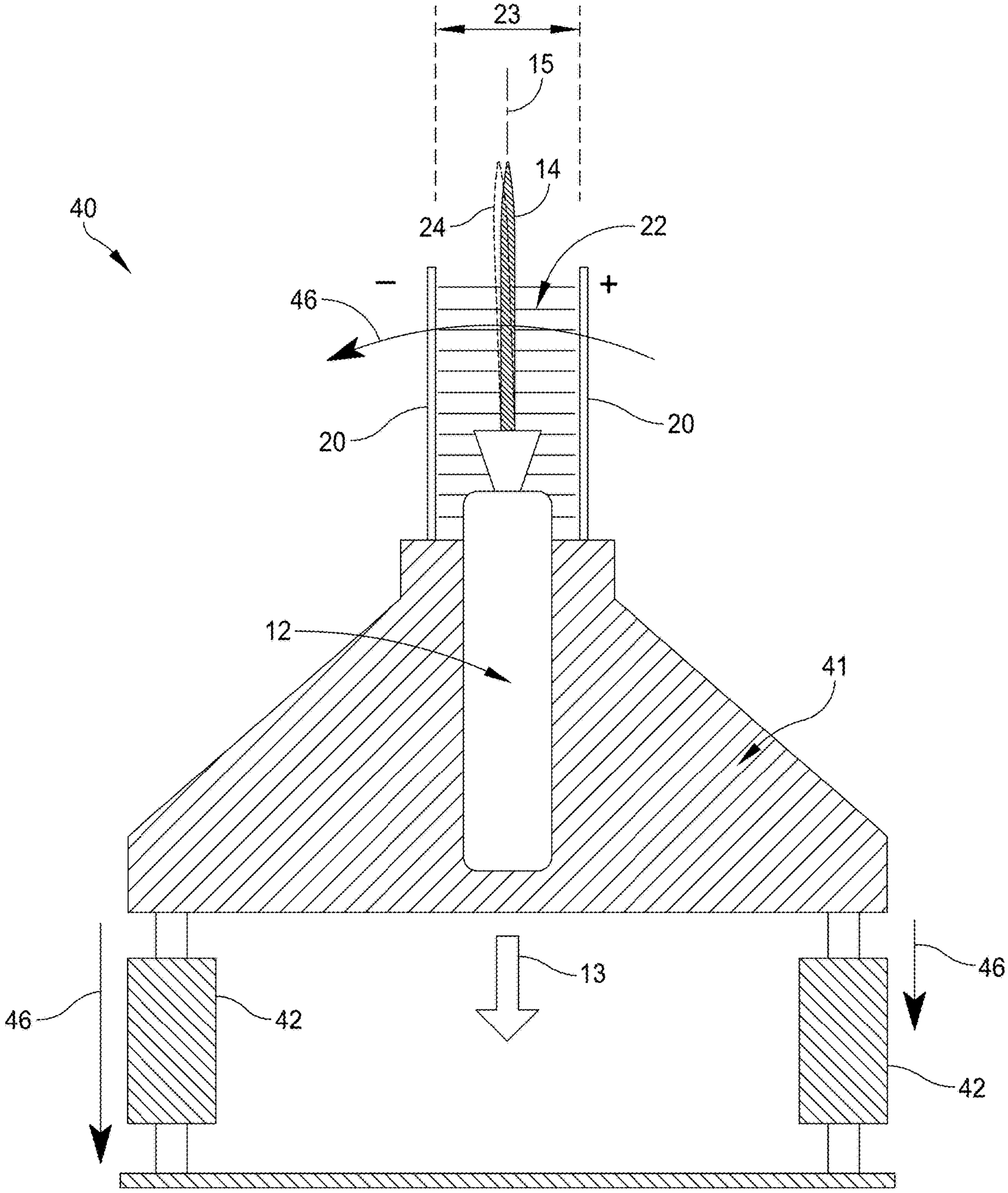
FIG. 10 is a diagram of a test fixture for measuring the thrust vectoring on a small rocket engine, in accordance with an embodiment of the present disclosure.

For example, using a 1000:1 transformer and a 12-18 volt battery, the high voltage DC supply may supply a pair voltage 31 of up to 12,000 to 18,000 volts to one or more of the parallel electrodes 20, as in the proof-of-concept tests of FIGS. 9-10. The resulting field intensity of the strong electric field 22 may depend on a spacing 23 between each of the parallel electrodes 20 in a pair. Setting the spacing 23 to one-tenth of a meter for the aforementioned pair voltage 31 may result in a strong field strength 22 of between 120 kV/m and 180 kV/m. Higher pair voltages 31 may be generated using existing techniques in order to achieve the lateral force necessary for the desired vectoring angle 25. For example, voltages of 800 kV or more may be achievable for the pair voltage 31 using the technologies of long-distance transmission lines in a national power grid.

Continuing now with FIGS. **5*a*-6 and 9-10, in various embodiments, the electrodes 20 may be formed of a high-temperature material such as steel, copper, graphite, niobium, molybdenum, tantalum, tungsten, or rhenium, and may be heat-treated or coated with a ceramic or a dielectric to withstand a heat of the propulsion system 10. In an embodiment not shown, electrodes 20 may be plated along an electrode length 21 of an inside surface of nozzle 16. Alternatively, the electrodes 20 may extend partially (FIGS. 5*a*, 6) or completely (FIG. 5*b*) outward from the nozzle exit 17. The nozzle 16 may include a region around and adjacently beyond the nozzle exit 17. Electrodes 20 may also straddle the exhaust jet 14 immediately outside the nozzle 16 and extend partially beyond the nozzle exit 17, as shown in FIG. 10**.

Referring now to FIG. 9, the proof-of-concept testing 40 of the vectoring method may include visually observing a deflection of an unaccelerated flame 14 of a Bunsen burner 45. Since the organic fuel-flame of a methane or propane burner 45 is similar to that of chemical rocket exhaust, one might expect similar deflection behavior. Applying 180 kV/m of electric field 22 to the flame 14 seems to produce between 22° to 64° for the flame vectoring angle 25 (not shown), depending on the oxygen/fuel mixture. This test result may indicate that the disclosed method and system has substantial potential to effect the vectoring angle 25 and azimuth 35 of the exhaust jet 14 of the propulsion system 10.

Continuing with FIG. 10, in an embodiment, a vertical engine mount 41 may secure a small rocket motor, in this case, an ammonium nitrate solid fuel rocket generative of about 10 seconds of rapid thrust 13. The ammonium nitrate fuel may behave representatively of any chemical propellant that the invention might use. Load cells 42 may be configured to measure the forward thrust 13 and a torque 46 produced when the exhaust jet 14 is deflected 24. Applying 180-240 kV/m of electric field strength (18-24 kV of electrode voltage), the vectoring angles 25 seem to repeatably deflect by 0.6° to 1.1° off the longitudinal axis 15, with good statistical significance. The smaller deflection, compared to the flame (FIG. 9) above, may be due to the relatively high exhaust velocity. The vectoring angle may be calculated based on the force measurements, provided by the load cells 42, as:

$$\text{vectoring angle} = \arctan\left[\text{lateral force/rocket thrust}\right]$$

Given that electrode voltages much greater than 18-24 KV are possible, it may be quite feasible to achieve ±10° or more of thrust vectoring 25 for a chemical propulsion system 10 by applying an electric field 22 across the exhaust jet 14.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A rocket propulsion system for steering a rocket using an electric field to vector a thrust of the propulsion system, the system comprising:

a chemical engine configured to oxidize or catalyze a propellant and produce an exhaust jet along a longitudinal jet axis and through an engine nozzle in a direction opposite the rocket thrust;

one or more pairs of parallel electrodes distributed circumferentially and along an electrode length of the nozzle, each pair arranged laterally for independently straddling the exhaust jet, the nozzle including a region beyond a nozzle exit, and the region beyond the nozzle exit includes the one or more electrode pairs extending outward from the nozzle exit;

a high-voltage DC supply connectable to the one or more pairs of electrodes and configured to impress a strong electric field across the exhaust jet;

a steering control configured to set a field intensity of the strong electric field proportional to a desired vectoring angle of the exhaust jet with respect to the longitudinal axis, the control also configured to weight among all of the one or more electrode pairs a pair voltage sent by the DC supply to each of the one or more electrode pairs, the weighting for steering the deflected exhaust to a desired azimuth, the steering control (1) configured to detect an arc across one or more of the electrode pairs, and the steering control (2) configured to adjust the electric field to stop the arc detected across the one or more of the electrode pairs while continuing to set the field intensity of the strong electric field proportional to the desired vectoring angle of the exhaust jet off the longitudinal axis; and where positively charged particles in the exhaust jet are accelerated laterally toward a negatively charged side of the one or more electrode pairs by the electric field.

2. The steering system of claim 1, wherein:

the exhaust jet results from oxidation or catalysis of a chemical fuel.

3. The steering system of claim 2, wherein:

where the chemical fuel includes one or more of liquid hydrogen, kerosene, liquid methane, hydrazine, and another hydrocarbon solid or liquid fuel.

4. The steering system of claim 1, wherein:

the propellant is one of hydrogen, kerosene, methane, and another hydrocarbon fuel.

5. The steering system of claim 1, wherein:

where the propellant is hydrazine.

6. The steering system of claim 1, wherein:

where the lateral acceleration by the strong field generates a lateral force competitive with the longitudinal thrust according to a geometric tangent of the vectoring angle.

* * * * *